United States Patent [19]
Zell et al.

[11] 3,985,259
[45] Oct. 12, 1976

[54] ANTI-SIPHONING DEVICE

[76] Inventors: George A. Zell, 811 Stovall Blvd. NE., Atlanta, Ga. 30342; Ralph A. Stogner, 2657 Acorn Ave., Atlanta, Ga. 30305

[22] Filed: Dec. 1, 1975

[21] Appl. No.: 636,460

Related U.S. Application Data
[63] Continuation-in-part of Ser. No. 452,186, March 18, 1974, abandoned.

[52] U.S. Cl............................ 220/86 AT; 29/240.5
[51] Int. Cl.² ........................................ B67C 3/00
[58] Field of Search ............... 220/86 AT; 29/240.5; 267/179, 180

[56] References Cited
UNITED STATES PATENTS

| | | | |
|---|---|---|---|
| 2,165,357 | 7/1939 | Emmert | 220/86 R |
| 2,210,061 | 8/1940 | Caminez | 29/240.5 |
| 2,496,992 | 2/1950 | Glidden | 220/86 AT |
| 2,825,750 | 3/1958 | Stockwell | 29/240.5 |

Primary Examiner—George E. Lowrance
Assistant Examiner—Allan N. Shoap
Attorney, Agent, or Firm—Frederick L. Bergert

[57] ABSTRACT

An anti-siphoning device for preventing the siphoning of gasoline from the gasoline tank of a motor vehicle is disclosed. The device is formed in a helical spring construction having an upper cylindrical-shaped portion and a lower cone-shaped portion. The cylindrical-shaped portion is formed of a series of contiguous or "kissing" coils, and the cone-shaped portion is also provided with a series of contiguous coils at its lower end. The lower end of the cone-shaped portion is provided with a bend so that the contiguous coil portion at the lower end of the spring projects outwardly at an angle of approximately 45° from the vertical axis of the device. The tips at the upper and lower ends of the device are formed so as to avoid any friction between adjacent surfaces which could cause sparks.

2 Claims, 3 Drawing Figures

ANTI-SIPHONING DEVICE

This is a continuation-in-part of application Ser. No. 452,186 filed Mar. 18, 1974, now abandoned.

BACKGROUND AND SUMMARY OF THE INVENTION

The present invention relates to an anti-siphoning device for preventing the siphoning of gasoline. More particularly, the present invention relates to an anti-siphoning device for gasoline tanks, the device being designed to fit the majority of automobiles presently on the market, including those fitted with baffles, and having improved features for preventing the siphoning of gas, while at the same time preventing friction between the various components which could result in the production of sparks.

Previous devices for preventing the siphoning of gasoline from automobile gas tanks have included cone-shaped spring devices such as those described in U.S. Pat. Nos. 1,925,079, 2,133,520 and 2,496,992, in which the cone-shaped device is attached near the outer rim of the gasoline fill pipe. In other prior art devices, such as those described in U.S. Pat. Nos. 2,007,805, 2,017,837 and 2,009,558, the spring portion of the device is located farther down the fill pipe at a point removed from the outer rim of the fill pipe. It has been found that the use of such prior art devices has not altogether resulted in preventing the tank from being siphoned, since a properly shaped siphon tube may penetrate between the coils of the spring of these prior art devices. In addition, it has been comparatively simple to remove the prior art devices, by the use of a screwdriver or similar means. Due to the interrelationship of the various components of these prior art devices, there is also an opportunity for sparking created by the sharp edge of one component striking the edge of another component.

By the present invention there is provided an anti-siphoning device in the form of a one-piece spring construction, the device of the present invention having features which effectively prevent removal of the device from the fill pipe of a gasoline tank, once the device has been installed. Furthermore, the construction of the anti-siphoning device of the present invention has been found to provide improved characteristics for preventing the insertion of a siphoning tube into the fill pipe of a tank which has been fitted with the device of the present invention. In addition, the construction of the present anti-siphoning device has been found to prevent the occurrence of sparks between components of the device. The anti-siphoning device of the present invention is of a shape which will fit the fill pipes of most modern-day automobiles, including those having fill pipes which are fitted with baffles.

The anti-siphoning device of the present invention includes a one-piece spring having an upper portion coiled in a cylindrical shape and a lower portion having the general shape of a cone. The cylindrical-shaped portion is formed of a series of contiguous or "kissing" coils, with at least six of such contiguous coils being present. The cone-shaped portion, which begins immediately below the lowermost contiguous coil of the cylindrical portion, is also provided with a series of contiguous coils at its lower end. At least four such contiguous coils are present in this position at the lower end of the cone-shaped portion. The lower end of the cone-shaped portion is provided with a bend so that the contiguous coil portion at the lower end of the spring projects outwardly at an angle of approximately 45° from the vertical axis of the device. Such features have been found to provide a highly secure fit for the spring in the neck of a fill pipe. This arrangement also provides improvements in preventing the insertion of a siphoning tube.

The extreme tips at both the upper and lower ends of the spring which make up the present device are curved inwardly away from the adjacent coils, in order to avoid the sparking tendencies which have been characteristic of prior art devices. In addition, a definite gap or space is provided between the tips of the spring and the adjacent coils to assist in preventing sparks.

BRIEF DESCRIPTION OF THE DRAWINGS

The features of the anti-siphoning device of the present invention will be more clearly understood from the following detailed description of the preferred embodiments, taken in conjunction with the accompanying drawings wherein.

DESCRIPTION OF THE PREFERRED EMBODIMENTS

Figure 1:
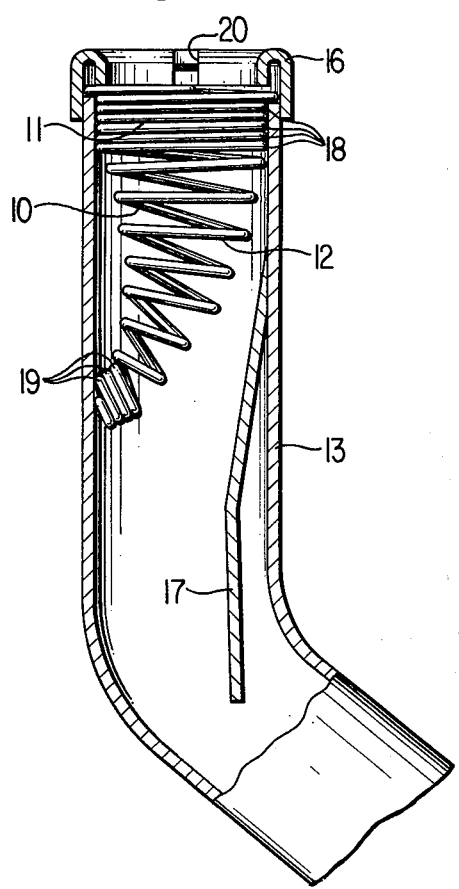
FIG. 1 is a side elevational view, partly in cross-section, of the improved anti-siphoning device of the present invention, shown installed in the fill pipe of a gasoline tank.
Figure 2:
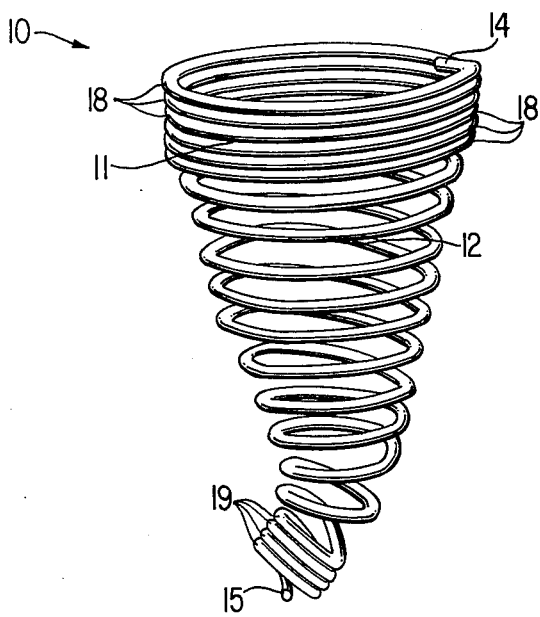
FIG. 2 is a perspective view of the anti-siphoning device of the present invention.
Figure 3:
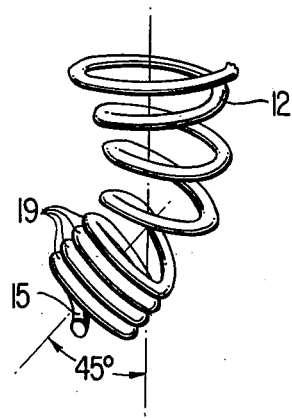
FIG. 3 is an enlarged elevational view of the lower end of the anti-siphoning device shown in FIG. 2.

In the embodiment of the anti-siphoning device of the present invention as illustrated in FIGS. 1, 2 and 3, there is provided a helical spring device 10 having a cylindrical-shaped upper portion 11 and a cone-shaped lower portion 12. In FIG. 1, the device 10 is shown installed in the fill pipe 13 of the gasoline tank (not shown) of a motor vehicle.

The cylindrical-shaped upper portion 11 of the device 10 is formed of a series of contiguous or "kissing" coils 18, with at least six of such coils 18 being present and arranged so as to be adjacent to each other in a contiguous or "kissing" relationship around the entire circumference thereof. Similarly, at least four of the lowermost coils 19 of the cone-shaped portion 12 are arranged in a contiguous or "kissing" relationship. In addition, the contiguous coil portion 19 of the lower end of the cone-shaped portion 12 is bent so that the longitudinal axis of the contiguous coil portion 19 projects outwardly at an angle of approximately 45° relative to the vertical axis of the device 10, as shown in detail in FIG. 3. This arrangement of contiguous coils 18, 19 at each end, with contiguous coils 18 making up the entire cylindrical portion 11 of the device 10, coupled with the 45° projection of the lower contiguous coils 19, has been found to provide a greatly improved tightness of fit of the device 10 in the fill pipe 13, as well as a highly effective means of preventing the insertion of a siphoning tube into the gas tank.

The tip 14 of the top or uppermost coil of the device 10 is turned inwardly away from the adjacent coils, in order to prevent friction which could generate sparks. Similarly, the tip 15 at the apex of the cone is turned inwardly, with a gap or space being provided between tips 14, 15 and the coils immediately opposite thereto in order to prevent sparking. A gap of about ⅛ inch between the tip 15 of the coil and the adjacent coils has been employed with good results, while the gap or space between upper tip 14 and the coil opposite thereto will, of course, be much greater. The lower tip 15 or "nib" also acts to block the central portion of the installed device 10 against entry by a siphon tube. In addition, the tip 15 is useful as a contact point for the screwdriver or similar tool during installation.

The particular configuration of the anti-siphoning device 10 of the present invention allows the device 10 to fit a maximum number of cars having gas tank construction of the type in manufacture today, including those which are fitted with baffles 17 in the fill pipes. These baffles 17 generally extend diametrically across the fill pipe 13 and are retained by the walls of the fill pipe 13. The baffles 17 are designed to prevent splashback of gasoline during filling of the tank and also to prevent gas from flowing out of the tank when the car is in an inclined position. Such baffle installations in fill pipes of gasoline tanks have been a common feature since about 1967.

As an example of the dimensions of a device 10 of the present invention which have been employed with good results, a device 10 having an overall length of about four inches, with the cylindrical portion 11 having a length of about ½ to ⅝ inches, and with a two-inch diameter for the cylindrical portion 11 of the device 10, may be employed. A particular spring material which has been advantageously employed is No. 13 W&M gauge spring wire.

In the installation of the device 10 of the present invention, it has been found advantageous to allow a minute or two after opening the gas tank for the volatile components in the neck of the fill pipe 13 to escape. The device 10 should then preferably be dipped in a general-purpose oil composition and inserted slowly into the fill pipe 13 so as not to cause any sparks. Employing a screwdriver or other similar device, the device 10 can be inserted slowly through either of the two notches 20 provided in the cap retainer lug 16.

During insertion, as the larger diameter coils of the cylindrical portion 11 of the device 10 are forced into the smaller diameter neck of the fill pipe 13, the spring coil material of the device 10 engages itself in one of the notches 20 in the cap retainer lug 16. Because it does engage the notch 20, upon completion of installation one of the upper contiguous coils 18 is in place under the inner lip of the retainer lug 16.

The relationship between the larger diameter of the spring coils 11 and the smaller diameter of the neck of the fill pipe 13 results in the spring coils at the upper portion 11 assuming an elliptical shape as they are forced into the neck of the fill pipe 13. This elliptical shape remains constant for the upper contiguous coils and becomes more circular down the length of the cylindrical portion 11 of the device 10.

As a result of this force on the cylindrical coils 11, and due to the properties of the spring steel in conjunction with the particular shape of the device 10, the device 10 is caused to curl over as if to return upon itself. This curled-over configuration of the device 10 as installed is shown in FIG. 1. This particular property of the device 10 of the present invention, in combination with the shape of the device 10, makes further insertion or removal of the device 10 virtually impossible. This is particularly true in the case where baffles 17 are installed in the fill pipe 13. Thus, the tendency of the installed device 10, upon being tampered with by someone attempting to remove it, is to back itself up and jam under the retainer lug 16.

From the foregoing description, it is apparent that the subject anti-siphoning device 10 can be effectively employed to prevent siphoning of the contents of a gas tank of an automobile or the like. It has been found that the construction of the device 10, particularly the arrangement of the contiguous coils at the upper and lower ends of the device 10, together with the angled projection at the lower end, provides (a) a tight fit which is highly advantageous in preventing the removal of the device 10 and (b) a highly effective configuration for preventing the insertion of a siphoning tube into the gas tank. In addition, the device 10 of the present invention effectively avoids the sparking tendencies which have been associated with anti-siphoning devices of the prior art.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

It is claimed:

1. An anti-siphoning device for insertion into the fill pipe of a gasoline tank, comprising: a helical spring having an upper cylindrical-shaped portion and a lower cone-shaped portion, said cylindrical-shaped portion being formed of at least six contiguous coils which are arranged in a contiguous relationship around the entire circumference of said coils, said cone-shaped portion commencing immediately following the lowermost contiguous coil of the cylindrical portion and having at least four of the lowermost coils of the cone-shaped portion arranged respectively in a contiguous relationship around the entire circumference of said coils, said contiguous coil portion at the lower end of the cone-shaped portion having its longitudinal axis projecting outwardly at an angle of approximately 45° relative to the vertical axis of the device.

2. The device of claim 1 wherein the tips at the upper and lower ends of the spring are turned inwardly away from adjacent coils, and with a gap being provided between said tips and the coils located immediately opposite.

* * * * *